Nov. 21, 1950 — W. S. THOMAS — 2,531,307
BATTERY TERMINAL CONNECTOR
Filed Feb. 9, 1948 — 2 Sheets-Sheet 1
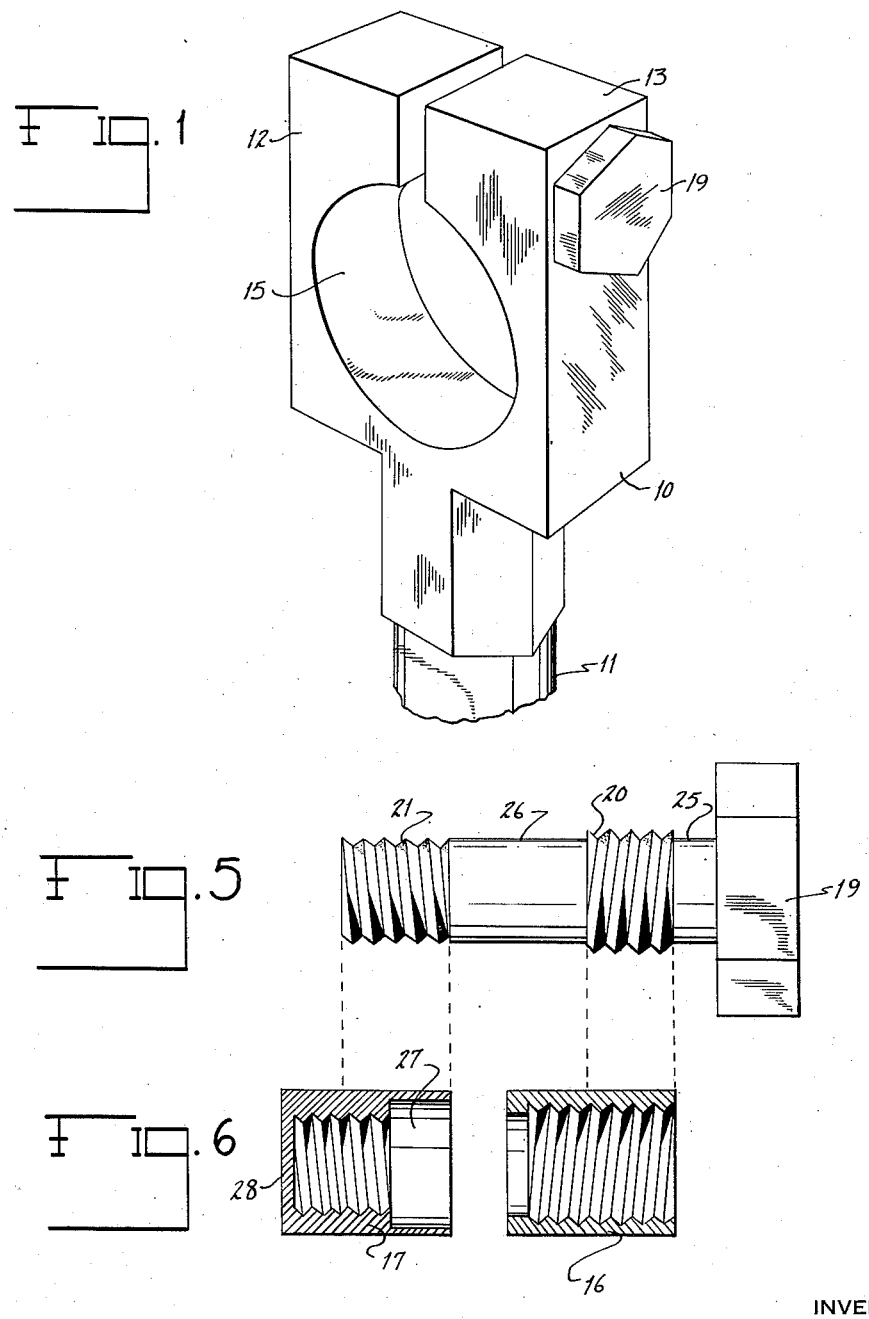
INVENTOR.
WILLIAM S. THOMAS
BY Joshua R. H. Potts
HIS ATTORNEY Nov. 21, 1950     W. S. THOMAS     2,531,307
BATTERY TERMINAL CONNECTOR
Filed Feb. 9, 1948     2 Sheets-Sheet 2
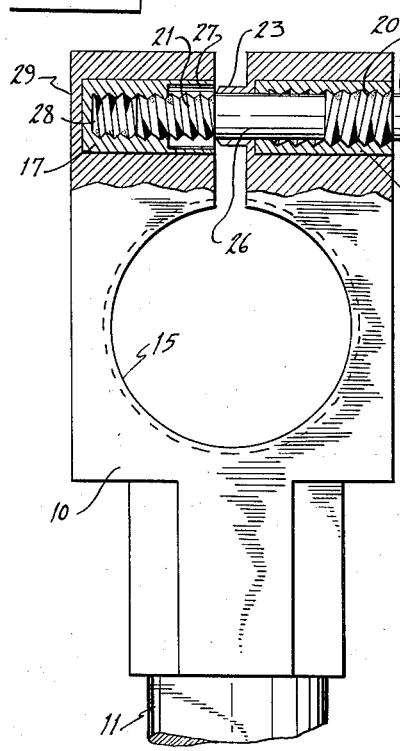
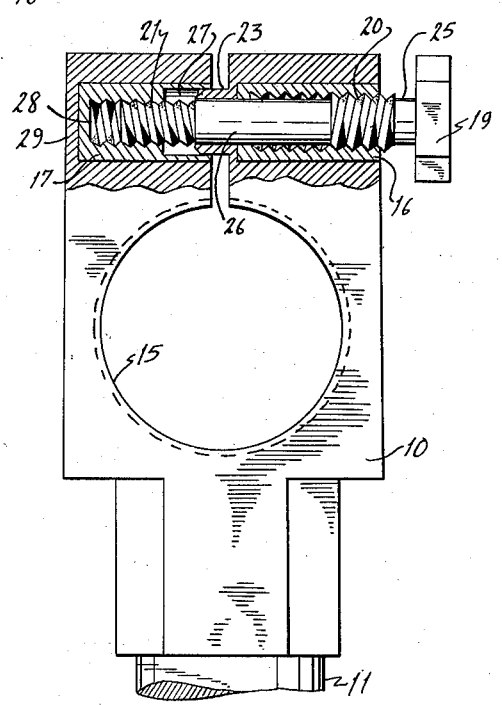
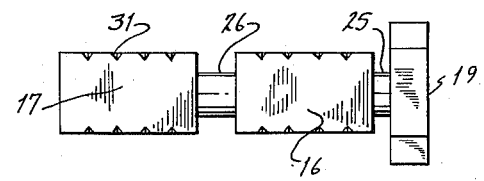
INVENTOR.
WILLIAM S. THOMAS
BY Joshua N. Potts
HIS ATTORNEY Patented Nov. 21, 1950

2,531,307

UNITED STATES PATENT OFFICE 2,531,307

BATTERY TERMINAL CONNECTOR

William S. Thomas, Williamsport, Pa., assignor, by mesne assignments, to Peter Zayac, Johnson City, Joseph Marconi, Endicott, and Henry C. Schloer, Vestal, N. Y., a partnership Application February 9, 1948, Serial No. 7,173

3 Claims. (Cl. 173—259)

The present invention relates to an improved battery terminal connector and more particularly to a battery terminal connector for an automobile storage battery or the like.

Although numerous attempts have been made to improve the battery terminal connector used to connect the battery in the electrical system of automotive vehicles, none of these attempts has been generally accepted by the automotive manufacturer, trade or the consumer. Fundamentally, the same design has been used since the inception of the automobile; namely, a split ring or sleeve having apertured lugs, a threaded bolt extending through the lugs and a nut on the threaded portion of the bolt as a tightening medium.

As is well known, terminals of batteries such as storage batteries are subject to corrosive action. The terminal connectors customarily contain soft pliable metal such as a lead alloy, which, due to long contact with the acids or fumes from the storage battery, corrode and deform to an extent making the removal from the battery post difficult. The removal of the connector usually requires a wrench or pliers to loosen the bolts and then a screw driver or other lever device plus a hammer to open the jaws of the clamp to remove it. During the use of such tools the post is subject to terrific strain and often is loosened from its sealing compound. In many cases, the cells are cracked and elements are knocked from the plates which damages the battery further.

In designing a battery terminal connector, there are a number of factors to be taken into consideration. Of particular importance is the cost and, thus, a desirable connector should not have a large number of complicated parts. In recent years, some battery manufacturers have placed the terminal post of the battery close to the filler caps and difficulty is often encountered when it is desired to remove the filler caps in order to add water to the cell. Thus, the connector should be relatively small but perhaps more important, however, is the locking or freezing on the battery post.

It is an object of the present invention to provide a battery terminal connector wherein both the jaws of the clamp are positively forced apart upon loosening of the connecting bolt.

It is a further object of this invention to provide a battery terminal connector, wherein the jaws are each engaged by screw threads of the same bolt.

Another object of the present invention is to provide a battery terminal connector, the jaws of which are of a soft metal but which have screw thread operating means of a harder metal.

It is a further object of the present invention to provide a battery terminal connector which may be removed by the use of a wrench alone.

Other objects relating to features of construction, combination of elements, and arrangement of parts, will be obvious from the following description of the preferred embodiment of the invention, reference being had to the accompanying drawings, wherein:

Figure 1 is a perspective view of one embodiment of my improved battery terminal connector;

Fig. 2 is a plan view, partly in section, of the clamp shown in Figure 1 in open position;

Fig. 3 is a plan view, partly in section, of the clamp shown in Figure 1 in closed position;

Fig. 4 is an elevational view of the bolt of Figures 2 and 3 with screw threaded bushings placed thereon;

Fig. 5 is a plan view of the bolt without the bushings; and,

Fig. 6 is a sectional view of the bushings.

Referring to the drawings, there is shown the clamp having a base 10 secured to a cable 11 in the customary manner and a pair of jaws 12 and 13. Within the jaws is a substantially circular recess 15 having a smooth surface tapering so that the widest part goes on the battery post first. Near the upper ends of the jaws, which are customarily of a soft pliable metal, are threaded bushings 16 and 17, preferably of a harder metal than the jaws. Threaded in these bushings is a bolt 19 having a larger threaded section 20, preferably containing left-hand threads, and a smaller threaded section 21, preferably containing right-hand threads. Threads in the bushing 16 are adapted to cooperate with the bolt threads 20, and threads in the bushing 17 are adapted to cooperate with the bolt threads 21, and it will be obvious that turning the bolt in one direction will bring the bushings and hence the jaws together as in Figure 3, while turning in the opposite direction will force the bushings apart as in Figure 2. The threaded section 20 is preferably shorter than the bushing 16 in which it operates.

Furthermore, as shown at Figures 2 and 3, the bushing 16 is preferably slightly shorter than the jaw in which it is located such that a coated smooth bushing 23 may be formed when the clamp is cast continuous with the jaw 12. The bolt is provided with a smooth portion of the shaft 25, adjacent the head of the bolt, and another smooth portion of the shaft 26 between the two threaded sections. The smooth portions 25 and 26 are preferably the root diameter of the threaded section 20, and the diameter of the smooth portion 26 is somewhat greater than the diameter of the threaded section 21. The bushing 17, furthermore, is provided with a countersunk portion 27 adapted to receive the soft metal smooth bushing 23. The outside end of bushing 17 is preferably closed as by closure 28 and a portion 29 of soft metal allowed to cover it.

In the manufacture of the device the threaded bushings are first threaded on to the bolt, as shown in Figure 4, and the bolt with the bushing thereon is placed in a mold and then the soft pliable metal poured around it. For purposes of anchoring the threaded bushings, they are preferably provided with notches 31. Figures 5 and 6 show the bolt and bushings respectively in the relative positions as they should preferably be placed in being put in the mold. While this is the open position of the jaws, there is ample space for further opening of the jaws or for closing of the jaws without jamming the device.

In the operation of the device, it will be seen that only a short turn with a wrench is required to tighten the jaws around the post since both sides of the jaws simultaneously move together and by a short turn in the opposite direction, the clamp positively disengages because the threads in the bushings forces the jaws apart simultaneously. Thus, only one wrench is necessary in the tightening or removing of this battery terminal clamp and the positive operation of the jaws upon the removal of the clamp removes the necessity for a screw driver or other lever plus a hammer which are usually required in removing the ordinary battery clamp.

In the preferable embodiment illustrated, it will be seen that the threaded sections 20 and 21 are of different diameters, as well as the corresponding threaded bushings. This is for the reason that the large bushing may first be threaded on the bolt and then the smaller bushing, and in this manner a single integral bolt may be used while still containing opposite threaded portions.

Also, it might be noted that the preferred embodiment illustrated provides left-hand threads adjacent the bolt head and right-hand threads on the smaller portion of the bolt on the opposite end from the head. By this arrangement, the clamp is tightened by the ordinary clockwise movement of the bolt and loosened by the ordinary counter clock-wise movement. Also, the arrangement provides that in tightening, the bolt head moves out from the adjacent jaw and thus cannot jam against the adjacent jaw face with further tightening. While these two features are particularly important it will be understood that the left and right-hand threads may be otherwise arranged. Furthermore, in the embodiment illustrated, there is provided a bolt head adapted to be turned by a wrench but it will be understood that a hexagonal or similar wrench gripping portion of the bolt might be located near the middle of the bolt or within the clamp opening but this is not preferable.

A particular advantage of the present type of connector is that it can be made rather small and thus avoid contact with the battery caps which is sometimes a disadvantage of the larger sized clamps. Another advantage of the present device is that the bolt cannot be accidentally removed from the clamp and lost. The present connector is adapted for positive opening of the jaws by moving the jaws an equal distance with an equal pressure on each. This requires less effort than that required to remove previous clamps and there is no damage to the battery.

A further advantage of the present device is the fact that the parts are assembled in the mold so that when the metal is poured, a complete connector is formed which requires no further assembling or machining. It is removed from the mold a finished product ready for use.

While certain preferable embodiments of the invention are hereinbefore set forth, it is to be clearly understood that the invention is not to be limited to the exact construction illustrated and described because various modifications of the details may be provided in putting the invention into practice within the purview of the appended claims.

What I claim is:

1. In a battery terminal connector comprising a U-shaped body member of soft metal defining an opening for receiving the terminal post and having a pair of clamping jaws, axially related bushings of hard metal embedded in the ends of said jaws, one of said bushings having a threaded blind-end bore and a smooth counterbore opening through the inner face of the jaw end embedding said bushing, the other bushing having an oppositely threaded bore extending substantially therethrough, a bolt having right and lefthand threaded sections in its end portions adapted to cooperate with the corresponding threads of said bushings for tightening and separating said jaws, and a smooth bushing of soft metal integral with and extending from the inner face of the jaw end embedding said other bushing and encircling an unthreaded intermediate portion of said bolt, said smooth bushing adapted to enter the counterbore in said one bushing when said clamping jaws are tightened.

2. In a battery terminal connector comprising a U-shaped body member of soft metal defining an opening for receiving the terminal post and having a pair of clamping jaws, axially related bushings of hard metal embedded in the ends of said jaws, one of said bushings having a threaded blind-end bore and a smooth counterbore opening through the inner face of the jaw and embedding said bushing, the other bushing having an oppositely threaded bore extending therethrough of larger diameter than the threaded bore of said first bushing, a headed bolt having right and lefthand threaded sections of different diameter in its end portions adapted to cooperate with the corresponding threads of said bushings for tightening and separating said jaws, the larger diameter threaded section being adjacent the bolt head, and a smooth bushing of soft metal integral with and extending from the inner face of the jaw end embedding said other bushing and encircling an unthreaded intermediate portion of said bolt, said smooth bushing adapted to enter the smooth counterbore in said one bushing when said jaws are tightened.

3. In a battery terminal connector comprising a U-shaped body member of soft metal defining an opening for receiving the terminal post and having a pair of clamping jaws, axially related bushings of hard metal embedded in the ends of said jaws, one of said bushings having a threaded blind-end bore and a smooth counterbore opening through the inner face of the jaw end embedding said bushing, the other bushing having an oppositely threaded bore extending therethrough of larger diameter than the threaded bore of said first bushing, a bolt having a head and right and lefthand threaded sections in its end portions, one threaded section having correspondingly larger diameter than the other threaded section and separated therefrom by a smooth threadless shaft portion, the larger-diameter threaded section being disposed adjacent the head of the bolt, said threaded sections of the stem adapted to cooperate with the corresponding threads of the axially related bushings for tightening and separating said jaws, said smooth threadless shaft portion having a diameter greater than the external diameter of the smaller-diameter threaded section and substantially equal to the root diameter of the threads of the larger-diameter threaded section, and a smooth bushing of soft metal integral with and extending from the inner face of the jaw end embedding said other bushing and encircling the threadless section of said bolt, said smooth bushing adapted to enter the smooth counterbore in said first bushing when said jaws are tightened.

WILLIAM S. THOMAS.

REFERENCES CITED

The following references are of record in the file of this patent:

UNITED STATES PATENTS

| Number | Name | Date |
|---|---|---|
| 1,690,310 | Pieh | Nov. 6, 1928 |
| 1,797,684 | Handler | Mar. 24, 1931 |
| 1,837,814 | Grunwald | Dec. 22, 1931 |
| 1,838,417 | Le May | Dec. 29, 1931 |
| 2,041,966 | Schaefer | May 26, 1936 |
| 2,140,843 | McGinnis et al. | Dec. 20, 1938 |

FOREIGN PATENTS

| Number | Country | Date |
|---|---|---|
| 820,629 | France | Aug. 2, 1937 |